US010060246B2

(12) United States Patent
Toti et al.

(10) Patent No.: US 10,060,246 B2
(45) Date of Patent: Aug. 28, 2018

(54) REAL-TIME PERFORMANCE ANALYZER FOR DRILLING OPERATIONS

(71) Applicant: LANDMARK GRAPHICS CORPORATION, Houston, TX (US)

(72) Inventors: Giulia Toti, Houston, TX (US); Peter C. Yu, Houston, TX (US); Avinash Wesley, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 15/025,625

(22) PCT Filed: Dec. 29, 2014

(86) PCT No.: PCT/US2014/072582
§ 371 (c)(1),
(2) Date: Mar. 29, 2016

(87) PCT Pub. No.: WO2016/108827
PCT Pub. Date: Jul. 7, 2016

(65) Prior Publication Data
US 2016/0356144 A1 Dec. 8, 2016

(51) Int. Cl.
*G01V 1/40* (2006.01)
*E21B 44/00* (2006.01)
*G05B 13/04* (2006.01)

(52) U.S. Cl.
CPC ............ *E21B 44/00* (2013.01); *G05B 13/04* (2013.01)

(58) Field of Classification Search
CPC ...... E21B 44/00; G05B 13/04; G01N 24/081; G01V 1/40
See application file for complete search history.

(56) References Cited

U.S. PATENT DOCUMENTS 9,482,084 B2\* 11/2016 Chang ................... E21B 44/00
2005/0197778 A1 9/2005 Downton
(Continued)

FOREIGN PATENT DOCUMENTS

WO 99/51849 A1 10/1999

OTHER PUBLICATIONS

International Search Report and Written Opinion issued in related PCT Application No. PCT/US2014/072582, dated Sep. 17, 2015 (13 pages).

(Continued)

*Primary Examiner* — Elias Desta
(74) *Attorney, Agent, or Firm* — Tenley Krueger; Baker Botts L.L.P.

(57) ABSTRACT

An example method includes receiving a data set containing combinations of drilling parameter values and operating condition values for a drilling system corresponding to each combination of drilling parameter values. At least one of a frequency and a duration of use may be determined for each of the combinations of drilling parameter values in the data set. For at least some of the combinations of drilling parameter values, a contour map identifying the combinations of drilling parameter values, the operating condition values corresponding to the combinations of drilling parameter values, and at least one of the frequency and the duration of use may be displayed for at least some of the combinations of drilling parameter values.

20 Claims, 9 Drawing Sheets

(56) References Cited

U.S. PATENT DOCUMENTS

2005/0284659 A1* 12/2005 Hall .................. E21B 44/00
　　　　　　　　　　　　　　　　　　　　　175/27
2012/0118637 A1　5/2012　Wang et al.
2014/0251688 A1　9/2014　Turner et al.
2014/0277752 A1　9/2014　Chang et al.
2015/0014058 A1* 1/2015　Wassell ............ E21B 44/00
　　　　　　　　　　　　　　　　　　　　　175/48

OTHER PUBLICATIONS

Dupriest, F.E. and Koederitz, W.L., "Maximizing drill rates with real-time surveillance of mechanical specific energy," SPE Paper 92194, Society of Petroleum Engineers. Jan. 2005.

International Preliminary Report on Patentability issued in related Application No. PCT/US2014/072582, dated Jul. 13, 2017 (9 pages).

\* cited by examiner

| HOLE DEPTH | WOB | RPM | ROP |
|---|---|---|---|
| 12836 | 27 | 115 | 62 |
| 12836 | 27 | 116 | 68 |
| 12836 | 27 | 110 | 56 |
| 12836 | 27 | 116 | 63 |
| 12837 | 27 | 117 | 51 |
| 12837 | 27 | 118 | 79 |
| 12837 | 27 | 115 | 36 |
| 12837 | 27 | 115 | 58 |
| 12837 | 27 | 115 | 55 |
| 12837 | 28 | 116 | 74 |
| 12838 | 29 | 1178 | 113 |
| 12838 | 29 | 113 | 108 |
| 12838 | 29 | 115 | 93 |
| 12838 | 29 | 107 | 112 |
| 12838 | 29 | 115 | 55 |
| 12838 | 29 | 116 | 41 |
| 12839 | 30 | 115 | 52 |
| 12839 | 31 | 116 | 86 |
| 12839 | 30 | 115 | 55 |
| 12839 | 30 | 110 | 44 |
| 12839 | 31 | 110 | 95 |
| 12839 | 32 | 118 | 70 |
| 12840 | 32 | 115 | 55 |
| 12840 | 32 | 111 | 73 |
| 12840 | 32 | 115 | 84 |
| 12840 | 32 | 114 | 124 |
| 12840 | 32 | 113 | 124 |
| 12841 | 32 | 116 | 104 |
| 12841 | 32 | 119 | 66 |
| 12841 | 32 | 111 | 74 |
| 12841 | 32 | 109 | 40 |
| 12841 | 32 | 118 | 89 |
| 12841 | 32 | 111 | 90 |
| 12841 | 32 | 117 | 81 |
| 12842 | 32 | 115 | 89 |
| 12842 | 32 | 113 | 82 |
| 12842 | 32 | 115 | 35 |

FIG. 2

| WOB BIN | RPM BIN | COUNTER | ROP AVG |
|---|---|---|---|
| $WOB_1$ | $RPM_N$ | 120 | 60.56 |
| $WOB_1$ | $RPM_2$ | 51 | 70.45 |
| ... | ... | ... | ... |
| $WOB_2$ | $RPM_1$ | 8 | 40.33 |
| $WOB_1$ | $RPM_1$ | 1 | 17.62 |

*FIG. 8*

REAL-TIME PERFORMANCE ANALYZER FOR DRILLING OPERATIONS

CROSS-REFERENCE TO RELATED APPLICATION

The present application is a U.S. National Stage Application of International Application No. PCT/US2014/072582 filed Dec. 29, 2014, which is incorporated herein by reference in its entirety for all purposes.

BACKGROUND

The present disclosure relates generally to well drilling operations and, more particularly, to a real-time performance analyzer for drilling operations.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site with a drilling assembly, treating the wellbore to optimize production of hydrocarbons, and performing the necessary steps to produce and process the hydrocarbons from the subterranean formation. An operator at the surface may control aspects of the drilling operation by setting drilling parameters for elements of the drilling assembly. The drilling parameters may affect the performance of the drilling operation, including, but not limited to, the rate of penetration (ROP) of the drilling assembly into the formation. Assessing the operator's performance in selecting the operational parameters can be problematic and typically requires computationally intense processing of bulk data after the wellbore is completed.

FIGURES

Some specific exemplary embodiments of the disclosure may be understood by referring, in part, to the following description and the accompanying drawings.

FIG. 2 is a diagram illustrating an example raw dataset of drilling parameter values and operating conditions collected during a drilling operation, according to aspects of the present disclosure.

FIG. 8 is a diagram illustrating an example chart of the results of a binning operating described above, according to aspects of the present disclosure.

Figure 1:
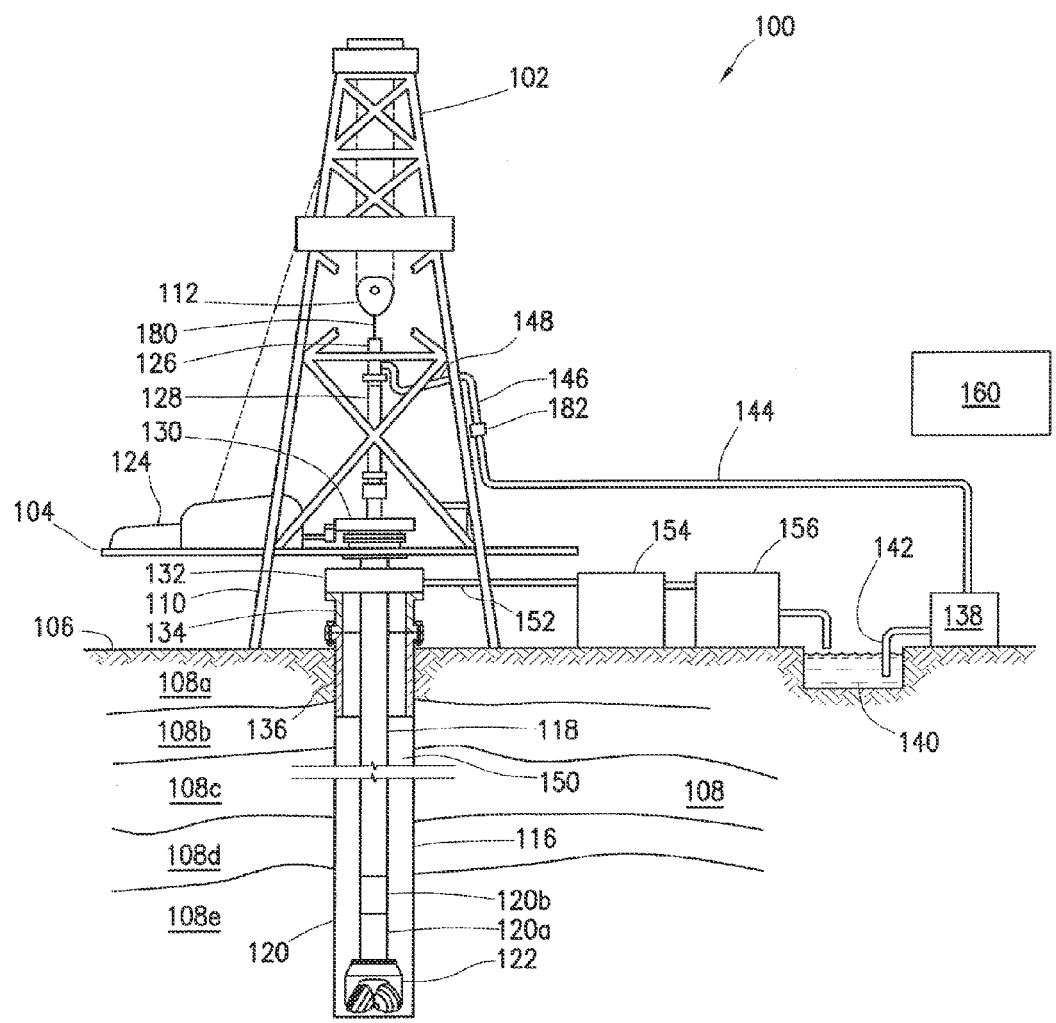
FIG. 1 is a diagram of an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

FIG. 1 is a diagram illustrating an example drilling system 100, according to aspects of the present disclosure. In the embodiment shown, the system 100 comprises a derrick 102 mounted on a floor 104 that is in contact with the surface 106 of a formation 108 through supports 110. The formation 108 may be comprised of a plurality of rock strata 108a-e, each of which may be made of different rock types with different characteristics. At least some of the strata 108a-e may be porous and contain trapped liquids and gasses. Although the system 100 comprises an "on-shore" drilling system in which floor 104 is at or near the surface, similar "off-shore" drilling systems are also possible and may be characterized by the floor 104 being separated by the surface 106 by a volume of water.

The drilling system 100 may comprise a drilling assembly that includes a drill string 118, a bottom hole assembly (BHA) 120, a drill bit 122. The drill string 118 may comprise multiple drill pipe segments that are threadedly engaged and may extend downwardly through a bell nipple 132, blow-out preventer (BOP) 134, and wellhead 136 into a borehole 116 within the formation 108. The wellhead 132 may include a portion that extends into the borehole 116. In certain embodiments, the wellhead 136 may be secured within the borehole 116 using cement. The BOP 134 may be coupled to the wellhead 136 and the bell nipple 1232, and may work with the bell nipple 132 to prevent excess pressures from the formation 108 and borehole 116 from being released at the surface 106. For example, the BOP 134 may comprise a ram-type BOP that closes the annulus between the drill string 118 and the borehole 116 in case of a blowout. The BHA 120 may be coupled to the drill string 118, and the drill bit 122 may be coupled to the BHA 122. The BHA 120 may include tools such as LWD/MWD elements 120a and telemetry system 120b. The LWD/MWD elements 120a may comprise downhole instruments, including sensors, that continuously or intermittently monitor downhole conditions, drilling parameters, and other formation data. Information generated by the LWD/MWD element 120a may be stored while the instruments are downhole and recovered at the surface later, or communicated to the surface using telemetry system 120b.

The derrick 102 may comprise a traveling block 112 for raising or lowering the drilling assembly within the borehole 116. The drilling assembly may be suspended from the traveling block 112 by a hook assembly 180 coupled to the traveling block 112. In the embodiment shown, the drilling assembly is suspended from the hook assembly 180 via a swivel 126 that is coupled to the drill string 118 through a kelly 128, which supports the drill string 118 as it is lowered through a top drive or rotary table 130. A motor 124 may control the relative position of the traveling block 122 and therefore the position of the drilling assembly within the borehole 116. Once the drill bit 122 contacts the bottom of the borehole 116, the motor 124 and traveling block 122 may be used to control the downward force applied to the drill bit 122 from the drilling assembly. Specifically, lowering the traveling block 122 will increase the downward force applied to the drill bit 122 by increasing the amount of drilling assembly weight born by the formation 108 through the drill bit 122 rather than by the hook assembly 180. Conversely, raising the traveling block 122 will decrease the downward force applied to the drill bit 122 by increasing the amount of drilling assembly weight born by the formation 108 through the drill bit 122. The downward force on the drill bit 122 may comprise a drilling parameter of the drilling system 100 referred to as the "weight-on-bit."

During drilling operations, drilling fluid, such as drilling mud, may be pumped in a mud pump 138 from a reservoir 140 through a suction line 142. The drilling mud may flow from the mud pump 138 into the drill string 118 at the swivel 126 through one or more fluid conduits, including pipe 144, stand-pipe 146, and hose 148. The drilling mud then may flow downhole through the drill string 118, exiting at the drill bit 122 and returning up through an annulus 150 between the drill string 118 and the borehole 116 in an open-hole embodiments, or between the drill string 118 and a casing (not shown) in a cased borehole embodiment. The rate at which the drilling mud flows downhole may be controlled by the pump 138 and may comprise a drilling parameter of the drilling system 100 referred to as the "flow rate."

While in the borehole 116, the drilling mud may capture fluids and gasses from the formation 108 as well as particulates or cuttings that are generated by the drill bit 122 engaging with the formation 108. The bell nipple 132 may be in fluid communication with the annulus 150, and drilling mud may flow through the annulus 150 to the bell nipple 132 where it exits though a return line 152. The return line 152 may be coupled to one or more fluid treatment mechanisms 154/156, and provide fluid communication between the annulus 150 and the fluid treatment mechanisms 154/156. The fluid treatment mechanisms 154/156 may separate the particulates from the returning drilling mud before returning the drilling mud to the reservoir 140, where it can be recirculated through the drilling system 100.

The drill bit 122 may be driven by rotation of the drill string 114 by the top drive 130. The top drive 130 may be coupled to the drill string 118 and driven by the motor 124 or a separate motor. The motor 124 or another motor of the system 100 may cause the top drive 130 and therefore the drill string 118 and drill bit 122 to rotate at a particular number of revolutions per minute (RPM). In alternative embodiments, a downhole motor, such as a fluid-driven turbine, may be deployed in the BHA 120 and may solely rotate the drill bit 122, or rotate the drill bit 122 in addition to rotation applied to the drill bit 122 through the top drive 130 and drill string 118. In those instances, the rotational speed of the drill bit 122 may be based, at least in part, on a flow rate of drilling fluid through the drill string 118. The rotational speed of the drill bit 122 may comprise a drilling parameter of the drilling system 100 referred to as the "drill bit RPM." Other drilling assembly arrangements are possible, as would be appreciated by one of ordinary skill in the art in view of this disclosure.

In certain embodiments, the system 100 may also comprise or more sensors that monitor the operating conditions of the system 100 in real-time or near real-time. The sensors may be located within the drilling assembly, such as within the LWD/MWD elements 120a of the BHA 120, and at other locations at the surface 106, such as the pressure sensors 182 coupled to the stand pipe 146. Operating conditions include, but are not limited to, the torque at the drill bit 122, the rate of penetration (ROP) of the drilling assembly, and the pressures within the fluid circulation system. The output of the sensors may be collected at the surface and stored, for example, in a database or data warehouse to be retrieved later.

In certain embodiments, the drilling system 100 may comprise a control unit 160 positioned at the surface 106. The control unit 160 may comprise an information handling system that may be communicably coupled to one or more controllable elements of the drilling system 100, including the pump 138 and motor 124. Controllable elements may comprise drilling equipment whose operating states can be altered or modified through an electronic control signals. An operator may interact with the controllable elements through the control unit 160 to alter the drilling parameters of the system 100. For example, an operator may set the drill bit RPM at a particular value, which may, in turn, cause the control unit 160 to issue a control signal to the motor 124 to alter the RPM of the top drive 130 and/or issue a control signal to the pump 138 to alter the flow rate of the drilling fluid. Similarly, the operator may set the WOB to a particular value, which may, in turn, cause the control unit 160 to issue a control signal to the motor 124 to move the traveling block 112.

The drilling parameters of the system 100 set by the operator may affect the operating conditions of the system 100. For example, the ROP of the drilling assembly, the torque at the drill bit, and the SPP may depend, in part, on the WOB, flow rate, and drill bit RPM. Generally, the operator may attempt to maintain the operating conditions in optimal ranges by searching for and identifying optimal combinations of drilling parameters. With respect to ROP, for example, the operator may attempt to alter the set points of the drilling parameters to maximize the ROP and therefore reduce the overall time it take to drill the well. It can be difficult, however, for an operator to synthesize and account for the ROP of a combination of drilling parameters in real time. Additionally, analyzing the performance of the drilling operation typically requires a bulk download of sensor and drilling parameter data and a gross approximation of performance with insufficient granularity to identify the performance of a single operator with respect to identifying optimal drilling parameter combinations.

According to aspects of the present disclosure, the performance of a drilling operation may be analyzed through the generation of multi-dimensional real-time or near real-time contour maps that visualize the operational parameters resulting from combinations of drilling parameters set by the operator over data ranges set by the operator or another user. The data ranges may comprise ranges of time or depth ranges from the drilling operation for which sensor data from the system 100 is collected and the drilling parameter set points are tracked and recorded. In certain embodiments, the contour maps may be overlaid with or augmented by statistical analyses identifying the operator's behavior within that data range. As will be described below, the contour maps may be generated in real time or near real time as the drilling operation progresses, allowing an operator to adjust "on the fly," or may be generated, stored, and later retrieved to granularly assess the performance of the drilling operation and the operator at each time and depth range.

FIG. 2 is a diagram illustrating an example raw dataset of drilling parameter values and operating conditions collected during a drilling operation. In the embodiment shown, the dataset comprises WOB values 201 and drill bit RPM value 202 set by an operator while the drill bit is a particular depth 203 in the formation, and the ROP values 204 resulting from the corresponding WOB and drill bit RPM values 201/202. Although the data set shown includes WOB and drill bit RPM as the tracked drilling parameters, other drilling parameters such as flow rate may be tracked as well. Additionally, other operating conditions, such as torque and SPP, may be tracked in addition to ROP, and all of the operating conditions and drilling parameters may be tracked in terms of time segments rather than hole depth. In certain instances, generating the raw dataset may comprise collecting and storing sensor data and drilling parameter values at an information handling system located at the drilling site, or collecting the sensor data and set drilling parameter values and transmitting the sensor data and set drilling parameter values to a data center, sever, or other storage device located remotely from the drilling site.

Figure 3:
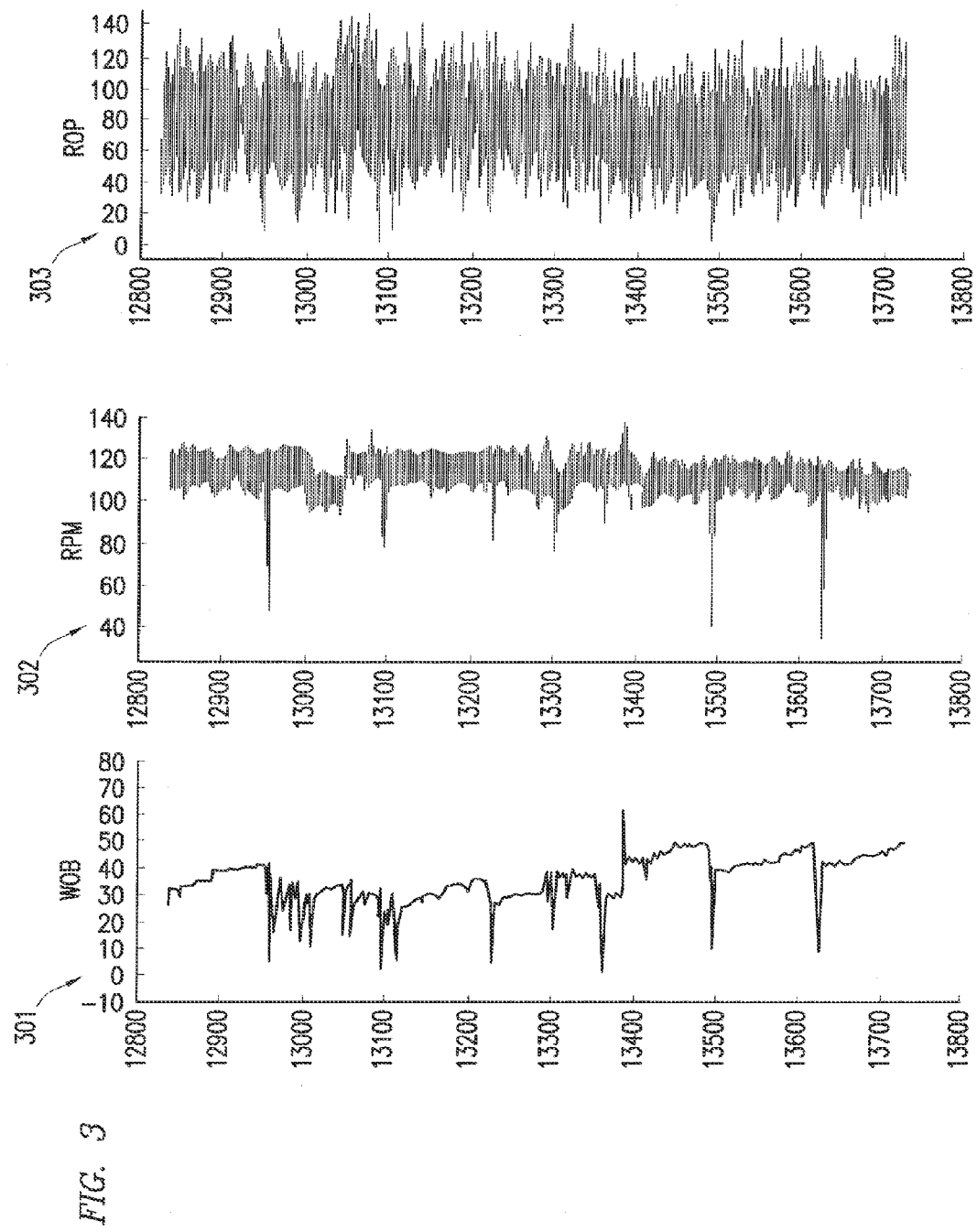
FIG. 3 is a diagram of example visualizations typically used by operators to identify optimal values for drilling parameters.

FIG. 3 is a diagram of example visualizations typically used by operators to identify optimal values for drilling parameters. In the embodiment shown, the visualizations are generated using a raw data set similar to the one describe above, with the visualization 301 corresponding to set WOB values by hole depth, the visualization 302 corresponding to set drill bit RPM values by hole depth, and visualization 303 corresponding to the ROP resulting from the associated WOB and drill bit RPM values at the corresponding hole depth. As can be seen, the visualizations 301-303 provide little if any context for the combinations of drilling parameters that lead to optimized ROP, nor do the visualizations provide a mechanism through which the performance of the operator in identifying and maintaining the combinations of drilling parameters that lead to optimized ROP can be assessed.

Figure 4A:
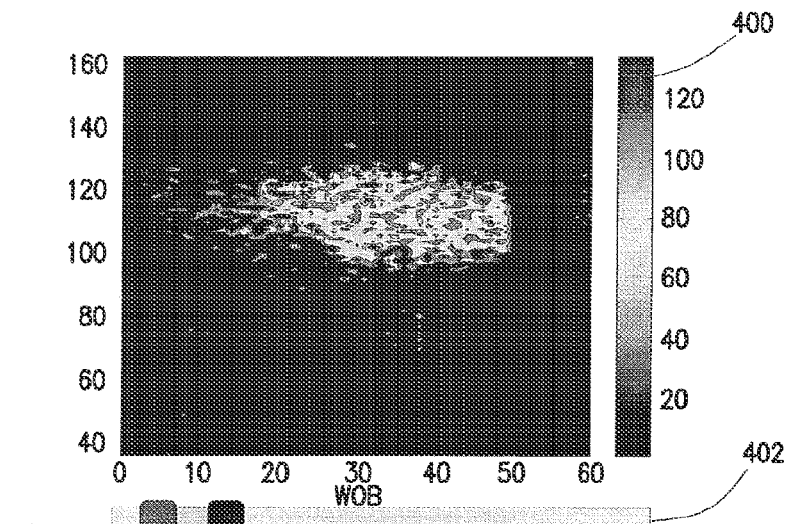
FIG. 4 is a diagram of an example multi-dimensional real-time or near real-time contour map that visualizes the operational parameters resulting from combinations of drilling parameters over particular data ranges, according to aspects of the present disclosure.
Figure 4B:
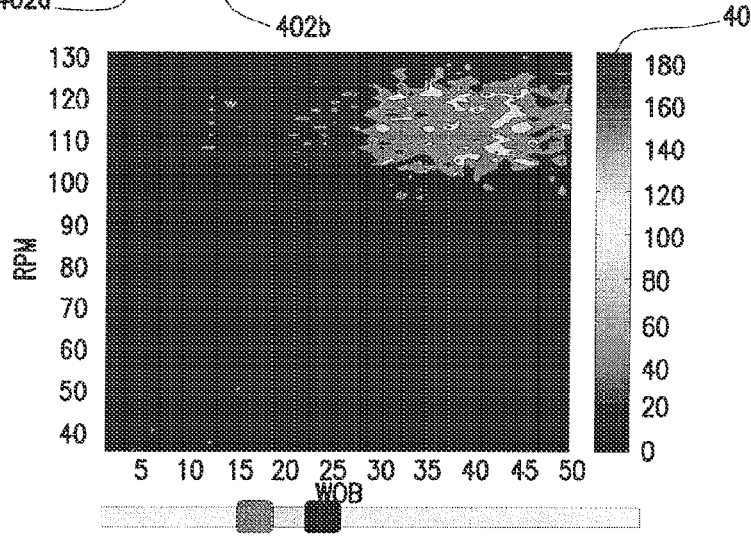
Figure 4C:
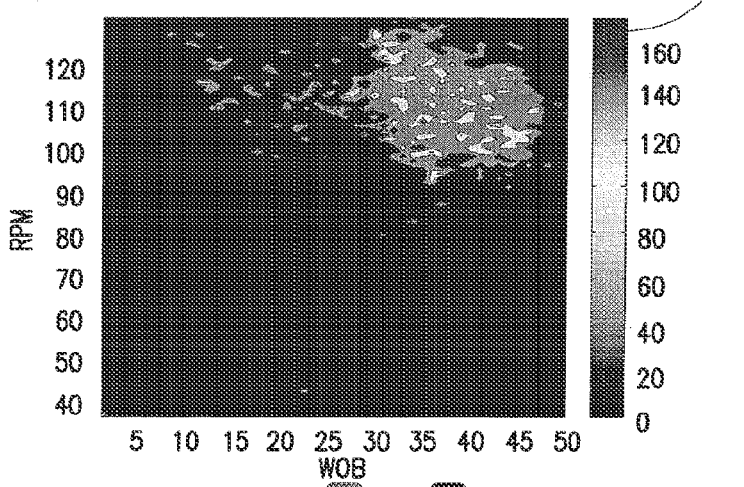

FIG. 4 is a diagram of an example multi-dimensional real-time or near real-time contour map that visualizes the operating conditions resulting from combinations of drilling parameters over particular data ranges, according to aspects of the present disclosure. As will be described in detail below, the contour map may be generated as part of a user interface in a control unit of a drilling system similar to the control unit described above with respect to FIG. 1. The contour map may be generated from a raw dataset similar to the one described above. In the embodiment shown, one drilling parameter (WOB) is plotted on an x-axis of the map 400, another drilling parameter (drill bit RPM) is plotted on a y-axis of the map 400, and the operating condition (ROP) resulting from the combination of drilling parameter values corresponding to a given x/y coordinate on the map 400 is plotted as a color gradient at that position. Other drilling parameters and operating conditions may be plotted in similar contour maps within the scope of this disclosure.

Each of the contour maps a, b, and c may be associated with a different range of time or depth from the drilling operation. In the embodiment shown, the range of time or depth may be selected using a graphical slider 402 in which an upper and lower bound for the range of time or depth is selected. Specifically, the slider may correspond to the range of available time or depth data available to be visualized within the map, and the buttons 402a/402b may be manipulated by the operator within a user interface of an information handling system, for example, to select the raw data range to be visualized within the map 400. The range of time or depth may be selected in other ways, including other graphical interfaces, as would be appreciated by one of ordinary Although static ranges of time or depth are shown, in certain embodiments, the range of time or depth may "float" or move forward as time passes or the drilling depth increases, such that the contour map updates with real time or near real time data corresponding to the current operating condition corresponding to the current drilling parameter values set by the operator.

Figure 5:
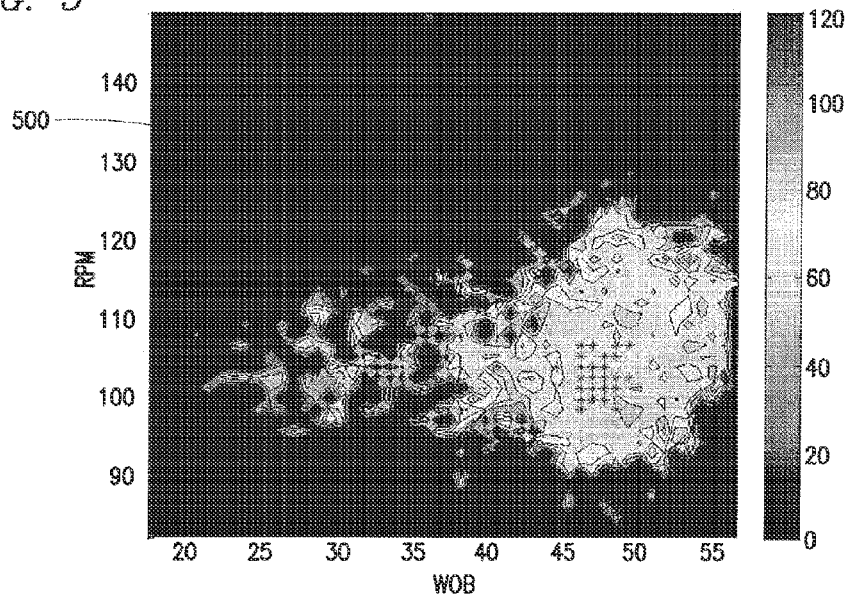
FIG. 5 is a diagram illustrating an example contour map with an overlay, according to aspects of the present disclosure.

In certain embodiments, at least one overlay or map augmentation may be used to identify in the contour map important drilling behaviors by the operator for the purpose of determining the performance of the operator. FIG. 5 is a diagram illustrating an example contour map with an overlay, according to aspects of the present disclosure. Like the map described above, the map 500 plots ROP values as a color gradient at combinations of WOB and RPM values that are plotted on the x- and y-axes, respectively. In the embodiment shown, however, the map 500 comprises indicators 502 plotted at certain combinations of drilling parameters within the map 500.

In certain embodiments, the indicators 502 may correspond, for example, to the combinations of drilling parameters that the operator used over some minimum threshold of time and/or depth. In those instances, the raw data may be received by a processor of an information handling system and the time/depth of use for each combination of drilling parameters may be accumulated. The processor may then display indicators for each combination of drilling parameters with an accumulated time/depth above a certain threshold. The threshold may be set by a user of the information handling system, such as an operator, through a graphical user interface (GUI), as will be explained below.

In other embodiments, the indicators 502 may correspond, for example, to the combinations of drilling parameters that are used with a frequency above a minimum frequency threshold. In those instances, the raw data may be received by a processor of an information handling system and the occurrences of each combination of drilling parameters may be tracked. The processor may then display indicators for each combination of drilling parameters with a number of occurrences above a certain percentage of the total number of entries in the selected raw data set. This percentage may be set by a user of the information handling system, such as an operation, through GUI.

The location and distribution of the indicators 502 within the map 500 may be used to determine the performance of the operator. For example, if the indicators 502 are clustered within an area in the map 500 with a relatively high ROP, then the operator was generally successful in identifying and maintaining optimal combinations of drilling parameters. If, on the other hand, the indicators 502 are spread out or generally clustered within an area of the map 500 with relatively low 502, then the operator was generally not successful in identifying and maintaining optimal combinations of drilling parameters.

Figure 6:
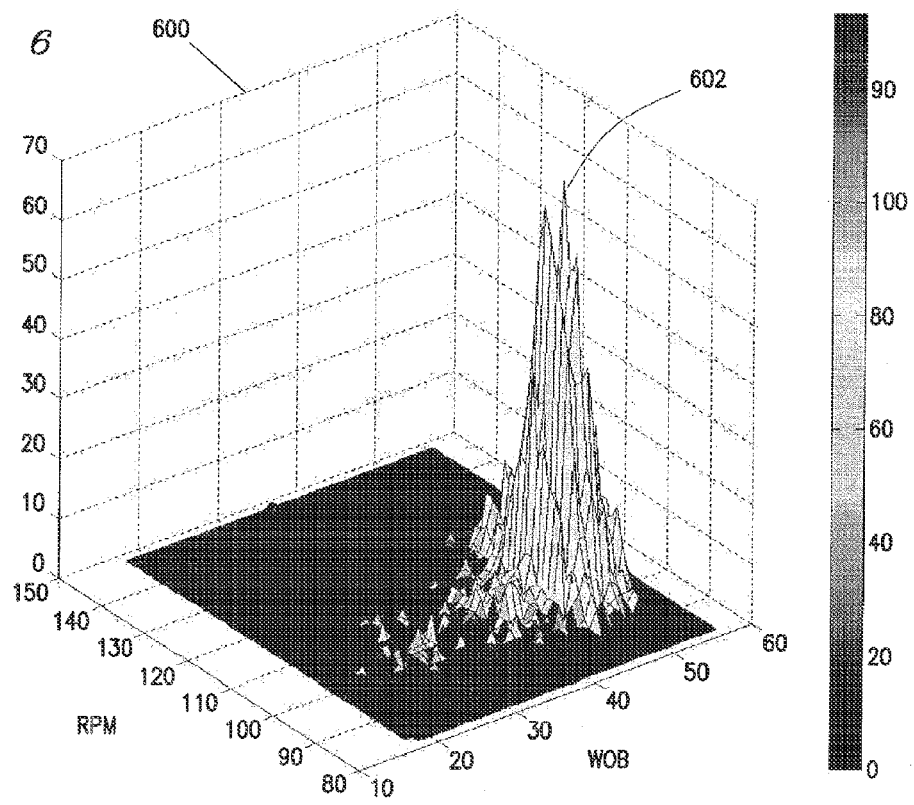
FIG. 6 is a diagram illustrating an example four-dimensional contour map, according to aspects of the present disclosure.

In certain embodiments, the actual frequency/time of use for the drilling parameter combinations used within a range of time or depth may be plotted. FIG. 6 is a diagram illustrating an example four-dimensional contour map 600 in which the actual frequency/time of use for each combination of drilling parameters is plotted as an elevation along the z-axis of the map 600, with the x- and y-axes and the color gradients plotted similarly to the maps described above. The map 600 provides additional information to determine the performance of the operator because it allows for a visual determination of the drilling parameter combination distribution as well as the frequency/duration of use for the drilling parameter combinations. In the embodiment shown, the map 600 illustrates a single spike located within an area with a relatively high ROP, indicating a generally good performance by the operator. If, on the other hand, the map 600 illustrated multiple spikes with lower heights located in areas with relatively low ROP, then the operator was generally not successful in identifying and maintaining optimal combinations of drilling parameters.

An example method for generating four-dimensional maps similar to map 600 may comprise receiving a raw data set at a processor of an information handling system and pre-processing the data. Receiving the raw data set may comprise receiving and accumulating the data directly from a drilling system, similar to the one described above, or receiving the raw data set from a data storage site in which the data from the drilling system is accumulated and stored. Pre-processing the raw data set may comprise removing outlier data points from the raw data set, including any drilling parameter combinations whose frequency and/or duration of use fall below a certain threshold and any drilling parameter combinations/operating condition values that fall outside of the numerical ranges to be displayed in the map. For example, minimum and maximum drilling parameter values (e.g. $WOB_{min}/WOB_{max}$ and drill bit $RPM_{min}$/drill bit $RPM_{max}$) and a range of operating condition values may be set by a user and values outside of those ranges may be excluded from the data set.

Figure 7:
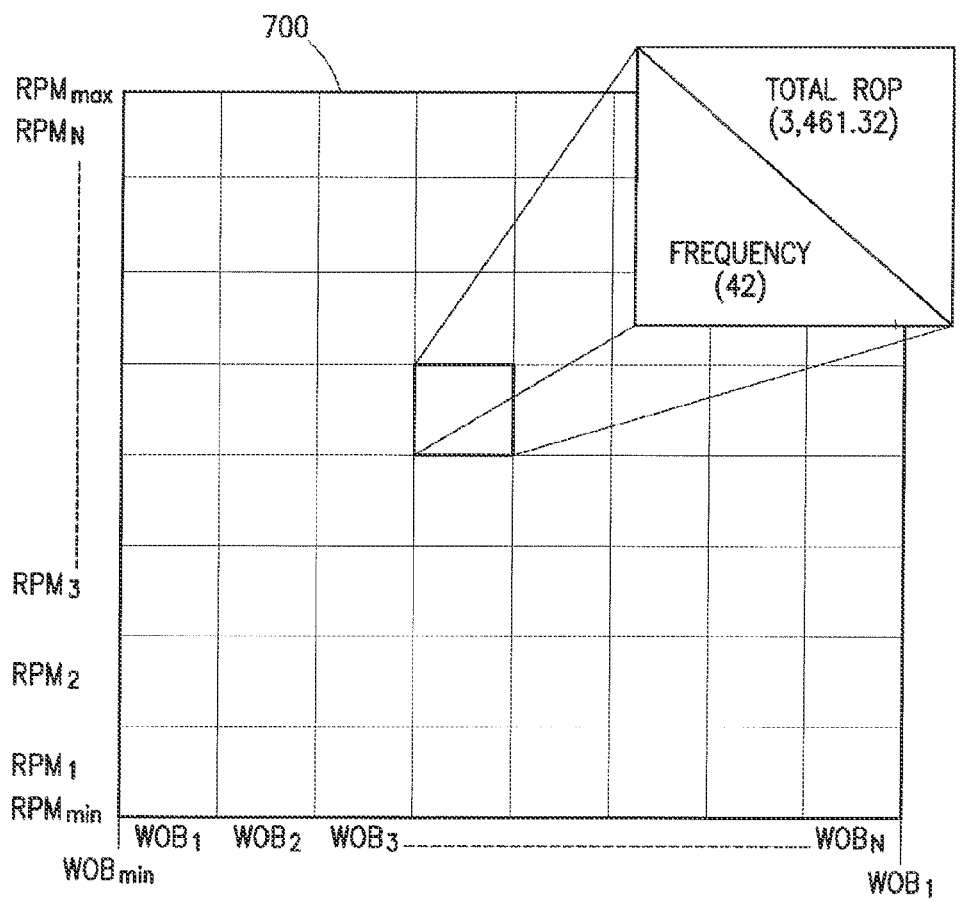
FIG. 7 is a diagram illustrating an example coordinate system divided into an N by M grid of bins, according to aspects of the present disclosure.

The method may further include determining the frequency/duration of use of each drilling parameter combination in the pre-processed raw data set. In certain embodiments, this may include dividing the pre-processed raw data set into a plurality of bins corresponding the minimum and maximum drilling parameter values to be displayed in the contour map. FIG. 7 illustrates an example coordinate system 700 divided into an N by M grid of bins, according to aspects of the present disclosure. In the embodiment shown, a range of first drilling parameter values, $WOB_{min}$ to $WOB_{max}$, is plotted on the x-axis and a range of second drilling parameter values, drill bit $RPM_{min}$ to drill bit $RPM_{max}$, is plotted on the y-axis. Each column of the grid may correspond to one of N different range of WOB values between $WOB_{min}$ and $WOB_{max}$ ($WOB_{1-N}$), and each row of the grid may correspond to one of M different ranges of drill bit RPM values between drill bit $RPM_{min}$ to drill bit $RPM_{max}$ (drill bit $RPM_{1-M}$). The number of bins may be changed to reflect the particular application needed, with a greater number of bins providing a greater granularity visualization.

In certain embodiments, the pre-processed raw data set may be divided into a plurality of bins by sorting each of the data points of the pre-processed data set into one of the bins. As used herein, a data point may comprise a combination of drilling parameter values and the operating condition value associated with that combination of drilling parameter values within the data set. Diving the data points into the bins may include processing the drilling parameters values at each data point to determine the column and row to which the drilling parameter values correspond. In certain embodiments, processing the drilling parameters values at each data point to determine the column and row to which the drilling parameter values correspond may include using the following equations:

$$\text{column}=\text{floor}((WOB(k)-WOB_{min})*N/(WOB_{max}-WOB_{min})); \text{ and}$$

$$\text{row}=\text{floor}((\text{drill bit } RPM(k)-\text{drill bit } RPM_{min})*M/(\text{drill bit } RPM_{max}-\text{drill bit } RPM_{min}));$$

where k is a numerical identifier given to each unique data point in the pre-processed raw data; WOB(k) corresponds to the WOB value at the kth unique data point; and drill bit RPM (k) corresponds to the drill bit RPM value at the kth unique data point. Notably, the above equations may be adapted to use other drilling parameter values as necessary.

Once a column and row are determined for each data point of the pre-processed raw data set, the operating condition value at each data point may be associated with the correct bin. This association may include increasing a counter for the bin indicating the number of data points associated with the bin, and adding the operating condition value of the data point to a cumulative total of all operating condition values of all data points associated with the bin. For example, if two data points are associated with bin $WOB_1$/drill bit $RPM_1$, with one data point corresponding to an operating condition value of 100 and the other corresponding to an operating condition value of 200, the counter for that bin may be set to two, and the cumulative operating condition value total may be set to 300. In certain instances, an average operating condition value for the bin may be calculated by dividing the cumulative operating condition value by the counter value.

FIG. 8 is an example chart 800 illustrating the results of the binning operating described above, according to aspects of the present disclosure. Each row 800 of the chart may correspond to a different bin of the plurality of bins illustrated in FIG. 7, with the first two columns 801/802 of the chart 800 indicating the column/row coordinates of associated bin, respectively. Column 803 indicates the counter value for each bin, indicating the number of data points from the pre-processed raw data set associated with the bin. Column 804 indicates the average operating condition value described above, here the average ROP value of each data point associated with the bin.

In certain embodiments, the method may further include generating a visualization that identifies the determined frequency/duration of a drilling parameter combination in the pre-processed raw data set. This step may include generating the visualization using the counter value and/or average operating condition value calculated above, along with the plurality of bins described above. Specifically, the visualization may comprise drilling parameter values plotted with respect to the x- and y-axes, except that the drilling parameter value are plotted with respect to the grid of bins, and the counter value at each bin is plotted in the z-axis. Additionally, the average condition value at each bin may be plotted as a color gradient.

Figure 9:
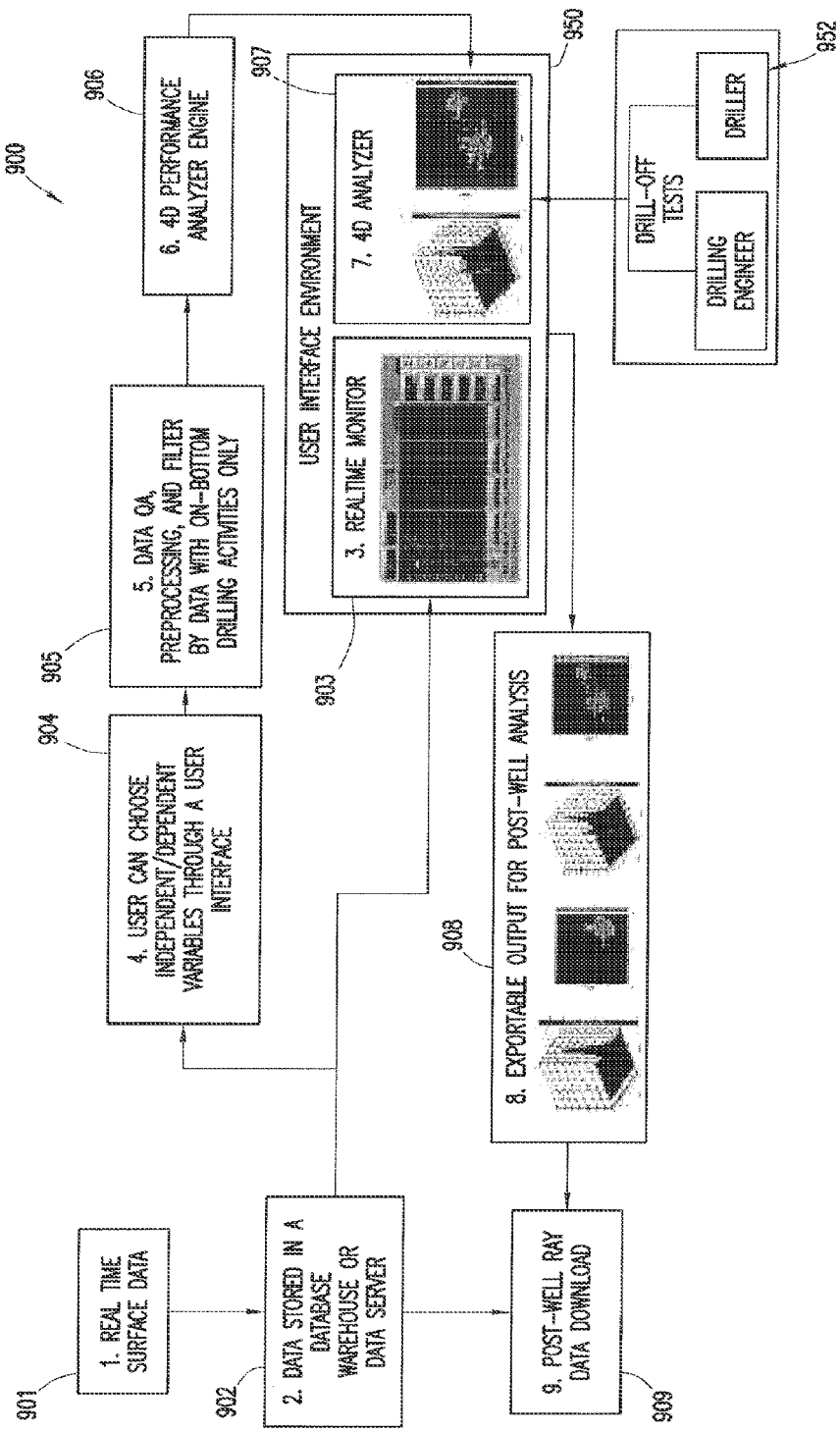
FIG. 9 is a diagram illustrating an example workflow for generating and reviewing a contour map, according to aspects of the present disclosure.

FIG. 9 is a diagram illustrating an example workflow for generating and reviewing a contour map, according to aspects of the present disclosure. At block 901, real-time data from a drilling operating may be captured. This real-time data may include drilling parameters set by an operator as well as the operating condition values resulting from the drilling parameter values. At block 902, the captured data may be stored in a database or data server. This may occur, for example, via a wireless transmission from the site of the drilling operating to a remote data center, or via any other transmission of data to a data storage facility located at the drilling site or at any other location.

At block 903, a surface control unit 950 located at the drilling site may receive the real-time data and display the data in a GUI. The displayed data may comprise the raw data set captured from the drilling operation. At any time before, during, or after the real-time data is displayed in the GUI at block 903, a user of the surface control unit 950, such as the operator, may choose the drilling parameters and operating conditions to plot in a contour map similar to the ones described above. The operator may choose the drilling parameters and operating conditions through the GUI in the control unit 950. At block 905, the control unit 950 may pre-process and quality check the data to remove any outliers, as described above. At block 906, the control unit 950 may generate the contour map based, at least in part, on the drilling parameters and operating conditions chosen by the user.

At block 907, the control unit 950 may display the generated contour map along with the raw data display in block 903. Notably, both may be displayed to the user simultaneously. As the drilling operation proceeds, the contour map in block 907 may update in real-time, allowing the operator to identify the drilling parameter values that optimize the operating condition. Additionally, at block 952, the operator or another user, such as a drilling engineer, may manipulate the contour map to identify trends in the operating conditions.

At block 908, the generated contour map may be exported from the control unit 950 and stored along with the real-time data stored in block 902. The data may be exported in real-time, daily, weekly, at the end of the drilling operating, or at any other time period necessary. In block 909, the real time data from block 902 along with the exported contour map data may be downloaded by a drilling engineer or any other user for the purpose to assessing the performance of the drilling operation. The bucketed contour map information may be viewed and manipulated by the drilling engineer in a GUI similar to the one generated in control unit 950. This may allow the drilling engineer to manipulate the data, including identifying and focusing on certain periods of time or drilling depths to assess the performance of the operator in identifying and selecting the drilling parameter values that optimize the operating conditions.

Figure 10:
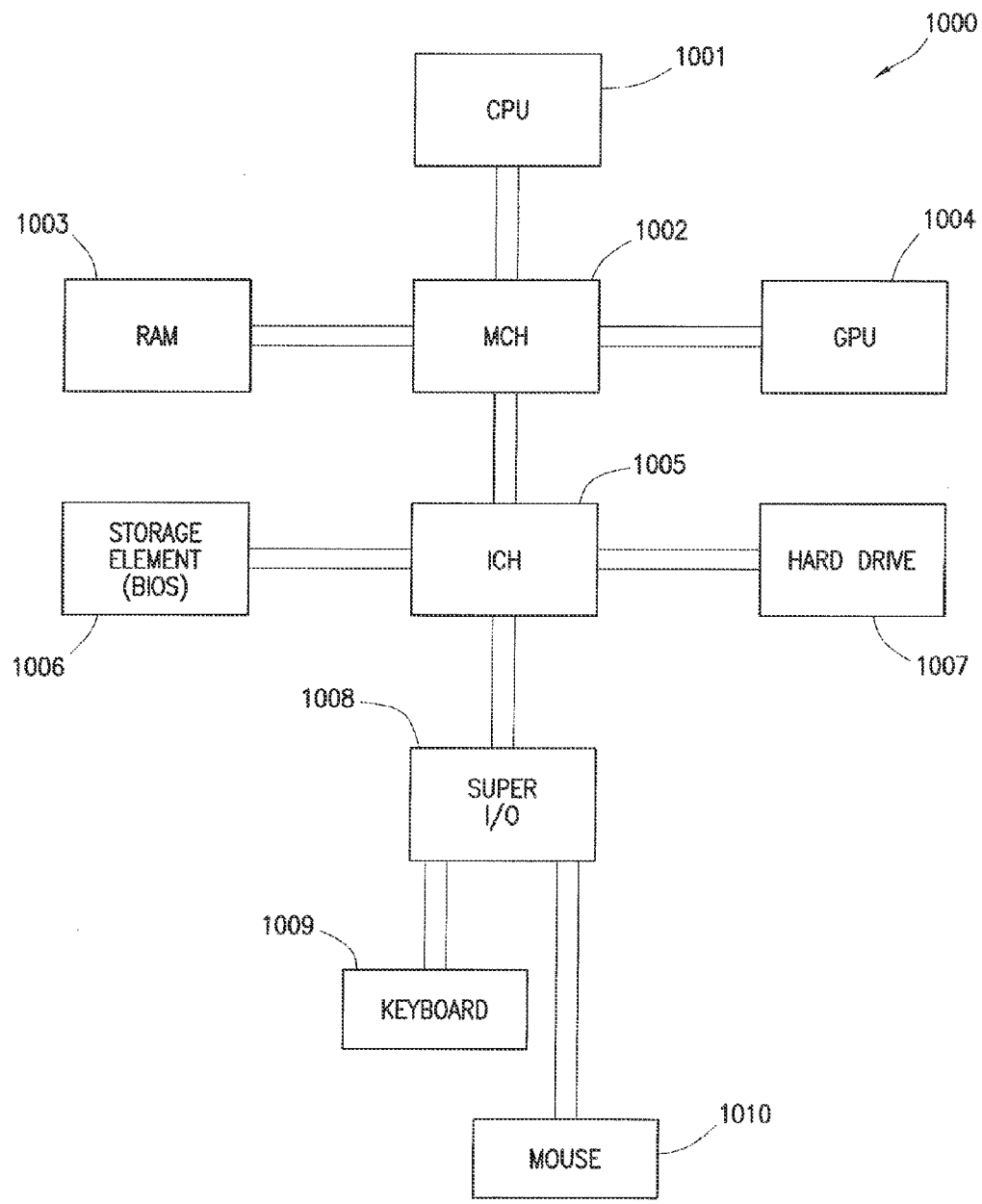
FIG. 10 is a diagram of an example information handling system, according to aspects of the present disclosure.

FIG. 10 is a block diagram showing an example information handling system 1000, according to aspects of the present disclosure. Information handling system 1000 may be used, for example, as part of a control system or unit for a drilling assembly. For example, a drilling operator may interact with the information handling system 1000 to alter drilling parameters or to issue control signals to drilling equipment communicably coupled to the information handling system 1000. The information handling system 1000 may comprise a processor or CPU 1001 that is communicatively coupled to a memory controller hub or north bridge 1002. Memory controller hub 1002 may include a memory controller for directing information to or from various system memory components within the information handling system, such as RAM 1003, storage element 1006, and hard drive 1007. The memory controller hub 1002 may be coupled to RAM 1003 and a graphics processing unit 1004. Memory controller hub 1002 may also be coupled to an I/O controller hub or south bridge 1005. I/O hub 1005 is coupled to storage elements of the computer system, including a storage element 1006, which may comprise a flash ROM that includes a basic input/output system (BIOS) of the computer system. I/O hub 1005 is also coupled to the hard drive 1007 of the computer system. I/O hub 1005 may also be coupled to a Super I/O chip 1008, which is itself coupled to several of the I/O ports of the computer system, including keyboard 1009 and mouse 1010. The information handling system 1000 further may be communicably coupled to one or more elements of a drilling system though the chip 1008.

According to aspects of the present disclosure, an example non-transitory computer readable medium may contain a set of instructions that, when executed by a processor, cause the processor to receive a data set containing combinations of drilling parameter values and operating condition values for a drilling system corresponding to each combination of drilling parameter values; and determine at least one of a frequency and a duration of use for each of the combinations of drilling parameter values in the data set. For at least some of the combinations of drilling parameter values, the instructions may cause the processor to display a contour map identifying the combinations of drilling parameter values, the operating, condition values corresponding to the combinations of drilling parameter values, and at least one of the frequency and the duration of use for at least some of the combinations of drilling parameter values.

In certain embodiments, the combinations of drilling parameter values comprise values corresponding to at least two of a weight-on-bit of the drilling system, a drill bit rotations-per-minute of the drilling system, and a flow rate of drilling fluid though the drilling system. In certain embodiments, the operating condition values comprise values corresponding to at least one of a rate of penetration of the drilling system, a stand pipe pressure of the drilling system, and a surface torque of the drilling system.

In any embodiment described in the preceding two paragraphs, the set of instructions that cause the processor to determine at least one of the frequency and the duration of use for each of the combinations of drilling parameter values in the data set may further cause the processor to sort the data set into a plurality of bins corresponding to the minimum and maximum drilling parameter values to be displayed in the contour map. In certain embodiments, the set of instructions that cause the processor to sort the data set into the plurality of bins corresponding to the minimum and maximum drilling parameter values to be displayed in the contour map further causes the processor to increase a counter value associated with a bin of the plurality of bins for each data point of the data set sorted into the bin of the plurality of bins; add to a cumulative operating condition value the operating condition value of each data point of the data set sorted into the bin of the plurality of bins; determine an average operating condition value by dividing the cumulative operating condition value by the counter value. In certain embodiments, the instructions that cause the processor to display the contour amp identifying the combinations of drilling parameter values, the operating condition values corresponding to the combinations of drilling parameter values, and at least one of the frequency and the duration of use for at least some of the combinations of drilling parameter values further causes the processor to display the contour map identifying the operating condition values corresponding to the combinations of drilling parameter values by displaying the average operating condition value; and display the contour map identifying the at least one of the frequency and the duration of use for at least some of the combinations of drilling parameter values by displaying the counter value In certain embodiments, the set of instruction further cause the processor to receive a user selection of a time or depth range of data points within the data set; and for the combinations of drilling parameter values and corresponding operating condition values within the selected time or depth range of data points within the data set, display a contour map identifying the combinations of drilling parameter values, the operating condition values corresponding to the combinations of drilling parameter values, and at least one of the frequency and the duration of use for at least some of the combinations of drilling parameter values.

According to aspects of the present disclosure, an example method includes receiving a data set containing combinations of drilling parameter values and operating condition values for a drilling system corresponding to each combination of drilling parameter values. At least one of a frequency and a duration of use may be determined for each of the combinations of drilling parameter values in the data set. For at least some of the combinations of drilling parameter values, a contour map identifying the combinations of drilling parameter values, the operating condition values corresponding to the combinations of drilling parameter values, and at least one of the frequency and the duration of use may be displayed for at least some of the combinations of drilling parameter values.

In certain embodiments, the combinations of drilling parameter values comprise values corresponding to at least two of a weight-on-bit of the drilling system, a drill bit rotations-per-minute of the drilling system, and a flow rate of drilling fluid though the drilling system. In certain embodiments, the operating condition values comprise values corresponding to at least one of a rate of penetration of the drilling system, a stand pipe pressure of the drilling system, and a surface torque of the drilling system.

In any of the embodiments described in the preceding two paragraphs, determining at least one of the frequency and the duration of use for each of the combinations of drilling parameter values in the data set may comprise sorting the data set into a plurality of bins corresponding to the minimum and maximum drilling parameter values to be displayed in the contour map. In certain embodiments, sorting the data set into the plurality of bins corresponding to the minimum and maximum drilling parameter values to be displayed in the contour map comprises increasing a counter value associated with a bin of the plurality of bins for each data point of the data set sorted into the bin of the plurality of bins; adding to a cumulative operating condition value the operating condition value of each data point of the data set sorted into the bin of the plurality of bins; and determining an average operating condition value by dividing the cumulative operating condition value by the counter value. In certain embodiments, displaying the contour map identifying the combinations of drilling parameter values, the operating condition values corresponding to the combinations of drilling parameter values, and at least one of the frequency and the duration of use for at least some of the combinations of drilling parameter values further comprises displaying the contour map identifying the operating condition values corresponding to the combinations of drilling parameter values by displaying the average operating condition value; and displaying the contour map identifying the at least one of the frequency and the duration of use for at least some of the combinations of drilling parameter values by displaying the counter value.

In certain embodiments, the method further includes receiving a user selection of a time or depth range of data points within the data set; and for the combinations of drilling parameter values and corresponding operating condition values within the selected time or depth range of data points within the data set, displaying a contour map identifying the combinations of drilling parameter values, the operating condition values corresponding to the combinations of drilling parameter values, and at least one of the frequency and the duration of use for at least some of the combinations of drilling parameter values.

According to aspects of the present disclosure, an example drilling system comprises controllable elements each positioned to control one or more drilling parameters values of the drilling system and at least one sensor positioned to measure at least one operating condition value of the drilling system, wherein the operating condition value is based, at least in part, on the one or more drilling parameters. A control unit may be coupled to the controllable elements, wherein the control unit comprises a processor and a memory device coupled to the processor, the memory device containing a set of instructions that, when executed by the processor, cause the processor to receive a data set containing combinations of drilling parameter values and operating condition values corresponding to each combination of drilling parameter values; determine at least one of a frequency and a duration of use for each of the combinations of drilling parameter values in the data set; and for at least some of the combinations of drilling parameter values, display a contour map identifying the combinations of drilling parameter values, the operating condition values corresponding to the combinations of drilling parameter values, and at least one of the frequency and the duration of use for at least some of the combinations of drilling parameter values.

In certain embodiments, the one or more drilling parameter comprise at least two of a weight-on-bit of the drilling system, a drill bit rotations-per-minute of the drilling system, and a flow rate of drilling fluid though the drilling system, and the operating condition values comprise at least one of a rate of penetration of the drilling system, a stand pipe pressure of the drilling system, and a surface torque of the drilling system. In certain embodiments, the set of instructions that cause the processor to determine at least one of the frequency and the duration of use for each of the combinations of drilling parameter values in the data set further cause the processor to sort the data set into a plurality of bins corresponding to the minimum and maximum drilling parameter values to be displayed in the contour map. In certain embodiments, the set of instructions that cause the processor to sort the data set into the plurality of bins corresponding to the minimum and maximum drilling parameter values to be displayed in the contour map further causes the processor to increase a counter value associated with a bin of the plurality of bins for each data point of the data set sorted into the bin of the plurality of bins; add to a cumulative operating condition value the operating condition value of each data point of the data set sorted into the bin of the plurality of bins; determine an average operating condition value by dividing the cumulative operating condition value by the counter value.

In certain embodiments, the instructions that cause the processor to display the contour map identifying the combinations of drilling parameter values, the operating condition values corresponding to the combinations of drilling parameter values, and at least one of the frequency and the duration of use for at least some of the combinations of drilling parameter values further causes the processor to display the contour map identifying the operating condition values corresponding to the combinations of drilling parameter values by displaying the average operating condition value; and display the contour map identifying the at least one of the frequency and the duration of use for at least some of the combinations of drilling parameter values by displaying the counter value. In certain embodiments, the set of instruction further cause the processor to receive a user selection of a time or depth range of data points within the data set; and for the combinations of drilling parameter values and corresponding operating condition values within the selected time or depth range of data points within the data set, display a contour map identifying the combinations of drilling parameter values, the operating condition values corresponding to the combinations of drilling parameter values, and at least one of the frequency and the duration of use for at least some of the combinations of drilling parameter values.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A non-transitory computer readable medium containing a set of instructions that, when executed by a processor, cause the processor to:

receive a data set containing combinations of drilling parameter values and operating condition values for a drilling system corresponding to each combination of drilling parameter values;

determine at least one of a frequency and a duration of use for each of the combinations of drilling parameter values in the data set;

plot at least a first drilling parameter of the data set on a first axis;

plot at least a second drilling parameter of the data set on a second axis;

plot as a color gradient at least a first operating condition of the data set resulting from the combination of the at least the first drilling parameter and at least the second drilling parameter;

plot as an elevation along a third axis at least one of a frequency and a duration of use;

display a contour map, wherein the contour map comprises the plotted at least first drilling parameter, the plotted at least second drilling parameter and the plotted color gradient;

overlay a map augmentation on the contour map, wherein the map augmentation comprises one or more indicators plotted at certain combinations of the at least the first drilling parameter and the at least the second drilling parameter;

identify one or more drilling parameter values that optimize at least one operating condition of the drilling system based, at least in part, on the displayed contour map with the map augmentation overlay; and identify performance of an operator based on the one or more indicators.

2. The non-transitory computer readable medium of claim 1, wherein the combinations of drilling parameter values comprise values corresponding to at least two of a weight-on-bit of the drilling system, a drill bit rotations-per-minute of the drilling system, and a flow rate of drilling fluid though the drilling system.

3. The non-transitory computer readable medium of claim 1, wherein the operating condition values comprise values corresponding to at least one of a rate of penetration of the drilling system, a stand pipe pressure of the drilling system, and a surface torque of the drilling system.

4. The non-transitory computer readable medium of claim 1, wherein the set of instructions that cause the processor to determine at least one of the frequency and the duration of use for each of the combinations of drilling parameter values in the data set further cause the processor to sort the data set into a plurality of bins corresponding to the minimum and maximum drilling parameter values to be displayed in the contour map.

5. The non-transitory computer readable medium of claim 4, wherein the set of instructions that cause the processor to sort the data set into the plurality of bins corresponding to the minimum and maximum drilling parameter values to be displayed in the contour map further causes the processor to increase a counter value associated with a bin of the plurality of bins for each data point of the data set sorted into the bin of the plurality of bins;

add to a cumulative operating condition value the operating condition value of each data point of the data set sorted into the bin of the plurality of bins;

determine an average operating condition value by dividing the cumulative operating condition value by the counter value.

6. The non-transitory computer readable medium of claim 5, wherein the instructions that cause the processor to display the contour map identifying the combinations of drilling parameter values, the operating condition values corresponding to the combinations of drilling parameter values, and at least one of the frequency and the duration of use for at least some of the combinations of drilling parameter values further causes the processor to display the contour map identifying the operating condition values corresponding to the combinations of drilling parameter values by displaying the average operating condition value; and display the contour map identifying the at least one of the frequency and the duration of use for at least some of the combinations of drilling parameter values by displaying the counter value.

7. The non-transitory computer readable medium of claim 1, wherein the set of instruction further cause the processor to receive a user selection of a time or depth range of data points within the data set; and for the combinations of drilling parameter values and corresponding operating condition values within the selected time or depth range of data points within the data set, display a contour map identifying the combinations of drilling parameter values, the operating condition values corresponding to the combinations of drilling parameter values, and at least one of the frequency and the duration of use for at least some of the combinations of drilling parameter values.

8. A method, comprising:

receiving a data set containing combinations of drilling parameter values and operating condition values for a drilling system corresponding to each combination of drilling parameter values;

determining at least one of a frequency and a duration of use for each of the combinations of drilling parameter values in the data set;

plotting at least a first drilling parameter of the data set on a first axis;

plotting at least a second drilling parameter of the data set on the second axis;

plotting as a color gradient at least a first operating condition of the data set resulting from the combination of the at least the first drilling parameter and the at least the second drilling parameter;

plot as an elevation along a third axis at least one of a frequency and a duration of use;

displaying a contour map, wherein the contour map comprises the plotted at least first drilling parameter, the plotted at least second drilling parameter and the plotted color gradient;

overlay a map augmentation on the contour map, wherein the map augmentation comprises one or more indicators plotted at certain combinations of the at least the first drilling parameter and the at least the second drilling parameter;

identifying one or more drilling parameter values that optimize at least operating condition of the drilling system based, at least in part, on the displayed contour map with the map augmentation overlay; and identify performance of an operator based on the one or more indicators.

9. The method of claim 8, wherein the combinations of drilling parameter values comprise values corresponding to at least two of a weight-on-bit of the drilling system, a drill bit rotations-per-minute of the drilling system, and a flow rate of drilling fluid though the drilling system.

10. The method of claim 8, wherein the operating condition values comprise values corresponding to at least one of a rate of penetration of the drilling system, a stand pipe pressure of the drilling system, and a surface torque of the drilling system.

11. The method of claim 8, wherein determining at least one of the frequency and the duration of use for each of the combinations of drilling parameter values in the data set comprises sorting the data set into a plurality of bins corresponding to the minimum and maximum drilling parameter values to be displayed in the contour map.

12. The method of claim 11, wherein sorting the data set into the plurality of bins corresponding to the minimum and maximum drilling parameter values to be displayed in the contour map comprises
increasing a counter value associated with a bin of the plurality of bins for each data point of the data set sorted into the bin of the plurality of bins;
adding to a cumulative operating condition value the operating condition value of each data point of the data set sorted into the bin of the plurality of bins; and
determining an average operating condition value by dividing the cumulative operating condition value by the counter value.

13. The method of claim 12, wherein displaying the contour map identifying the combinations of drilling parameter values, the operating condition values corresponding to the combinations of drilling parameter values, and at least one of the frequency and the duration of use for at least some of the combinations of drilling parameter values further comprises
displaying the contour map identifying the operating condition values corresponding to the combinations of drilling parameter values by displaying the average operating condition value; and
displaying the contour map identifying the at least one of the frequency and the duration of use for at least some of the combinations of drilling parameter values by displaying the counter value.

14. The method of claim 8, wherein the method further comprises
receiving a user selection of a time or depth range of data points within the data set; and
for the combinations of drilling parameter values and corresponding operating condition values within the selected time or depth range of data points within the data set, displaying a contour map identifying the combinations of drilling parameter values, the operating condition values corresponding to the combinations of drilling parameter values, and at least one of the frequency and the duration of use for at least some of the combinations of drilling parameter values.

15. A drilling system, comprising:
controllable elements each positioned to control one or more drilling parameters values of the drilling system;
at least one sensor positioned to measure at least one operating condition value of the drilling system, wherein the operating condition value is based, at least in part, on the one or more drilling parameters;
a control unit coupled to the controllable elements, wherein the control unit comprises a processor and a memory device coupled to the processor, the memory device containing a set of instructions that, when executed by the processor, cause the processor to
receive a data set containing combinations of drilling parameter values and operating condition values corresponding to each combination of drilling parameter values;
determine at least one of a frequency and a duration of use for each of the combinations of drilling parameter values in the data set;
plot at least a first drilling parameter of the data set on a first axis;
plot at least a second drilling parameter of the data set on a second axis;
plot as a color gradient the at least a first operating condition of the data set resulting from the combination of the at least the first drilling parameter and the at least the second drilling parameter;
plot as an elevation along a third axis at least one of a frequency and a duration of use;
display a contour map, wherein the contour map comprises the plotted at least first drilling parameter, the plotted at least second drilling parameter and the plotted color gradient;
overlay a map augmentation on the contour map, wherein the map augmentation comprises one or more indicators plotted at certain combinations of the at least the first drilling parameter and the at least the second drilling parameter;
identify one or more drilling parameter values that optimize at least one operating condition of the drilling system based, at least in part, on the displayed contour map with the map augmentation overlay; and
identify performance of an operator based on the one or more indicators.

16. The system of claim 15, wherein
the one or more drilling parameter comprise at least two of a weight-on-bit of the drilling system, a drill bit rotations-per-minute of the drilling system, and a flow rate of drilling fluid though the drilling system;
the operating condition values comprise at least one of a rate of penetration of the drilling system, a stand pipe pressure of the drilling system, and a surface torque of the drilling system.

17. The system of claim 15, wherein the set of instructions that cause the processor to determine at least one of the frequency and the duration of use for each of the combinations of drilling parameter values in the data set further cause the processor to sort the data set into a plurality of bins corresponding to the minimum and maximum drilling parameter values to be displayed in the contour map.

18. The system of claim 17, wherein the set of instructions that cause the processor to sort the data set into the plurality of bins corresponding to the minimum and maximum drilling parameter values to be displayed in the contour map further causes the processor to
increase a counter value associated with a bin of the plurality of bins for each data point of the data set sorted into the bin of the plurality of bins;
add to a cumulative operating condition value the operating condition value of each data point of the data set sorted into the bin of the plurality of bins;
determine an average operating condition value by dividing the cumulative operating condition value by the counter value.

19. The system of claim 18, wherein the instructions that cause the processor to display the contour map identifying the combinations of drilling parameter values, the operating condition values corresponding to the combinations of drilling parameter values, and at least one of the frequency and the duration of use for at least some of the combinations of drilling parameter values further causes the processor to
- display the contour map identifying the operating condition values corresponding to the combinations of drilling parameter values by displaying the average operating condition value; and
- display the contour map identifying the at least one of the frequency and the duration of use for at least some of the combinations of drilling parameter values by displaying the counter value.

20. The system of claim 15, wherein the set of instruction further cause the processor to
- receive a user selection of a time or depth range of data points within the data set; and
- for the combinations of drilling parameter values and corresponding operating condition values within the selected time or depth range of data points within the data set, display a contour map identifying the combinations of drilling parameter values, the operating condition values corresponding to the combinations of drilling parameter values, and at least one of the frequency and the duration of use for at least some of the combinations of drilling parameter values.

* * * * *